United States Patent [19]

Komori

[11] Patent Number: 4,602,333
[45] Date of Patent: Jul. 22, 1986

[54] STORAGE OF IMAGE DATA IN BOTH ORIGINAL AND COMPRESSED FORMS

[75] Inventor: Tomoyasu Komori, Ootawara, Japan

[73] Assignee: Kabushiki Kaisha Toshiba, Japan

[21] Appl. No.: 650,855

[22] Filed: Sep. 14, 1984

[30] Foreign Application Priority Data

Sep. 16, 1983 [JP] Japan ................. 58-170905

[51] Int. Cl.[4] ............................. G06F 15/42
[52] U.S. Cl. ............. 364/414; 340/347 DD;
    358/261; 358/138; 382/56
[58] Field of Search ............. 364/414; 378/901;
    382/56; 358/138, 135, 260, 261; 340/347 DD

[56] References Cited

U.S. PATENT DOCUMENTS 4,369,463 1/1983 Awastussion ............ 358/138
4,562,467 12/1985 Bradley .................. 358/138

OTHER PUBLICATIONS

Symposium on Physical and Technical Aspects of Transmission and Emission Computed Tomography Abstracts 2m-41, 1979.

Primary Examiner—Jerry Smith
Assistant Examiner—G. Hayes
Attorney, Agent, or Firm—Finnegan, Henderson, Farabow, Garrett & Dunner

[57] ABSTRACT

A tomographic image processing apparatus includes at least an image data production device, a main memory, a compression circuit, a write circuit, a magnetic disk, a read circuit, an expansion circuit and an image processing device. The magnetic disk has at least two storage areas. The compressed image data and the non-compressed image data are made from one image data. The compressed image data has priority over the non-compressed image data in the storage operation of the magnetic disk.

8 Claims, 11 Drawing Figures

F I G. 5
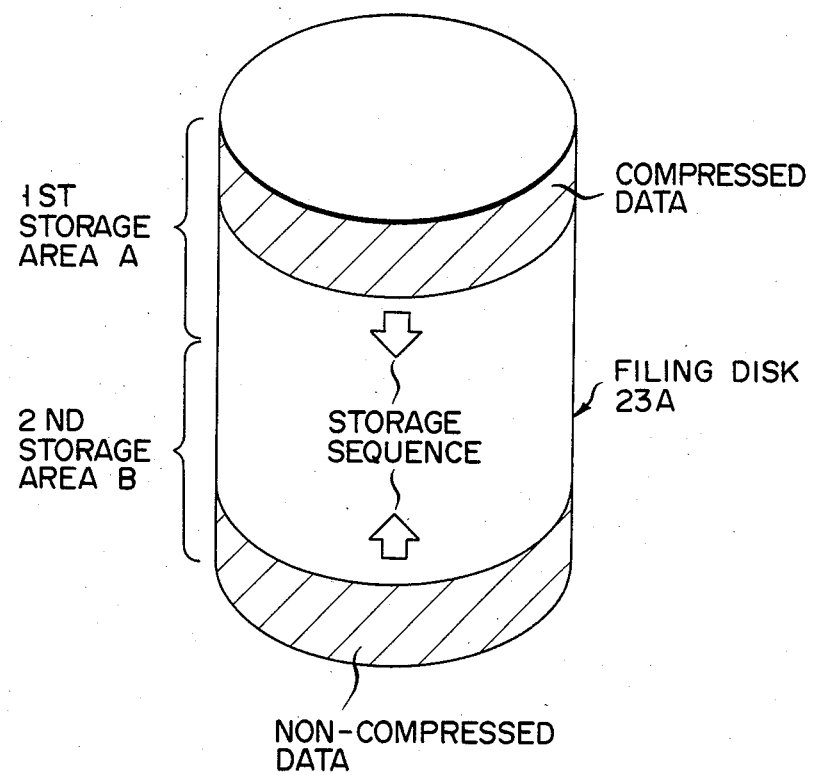

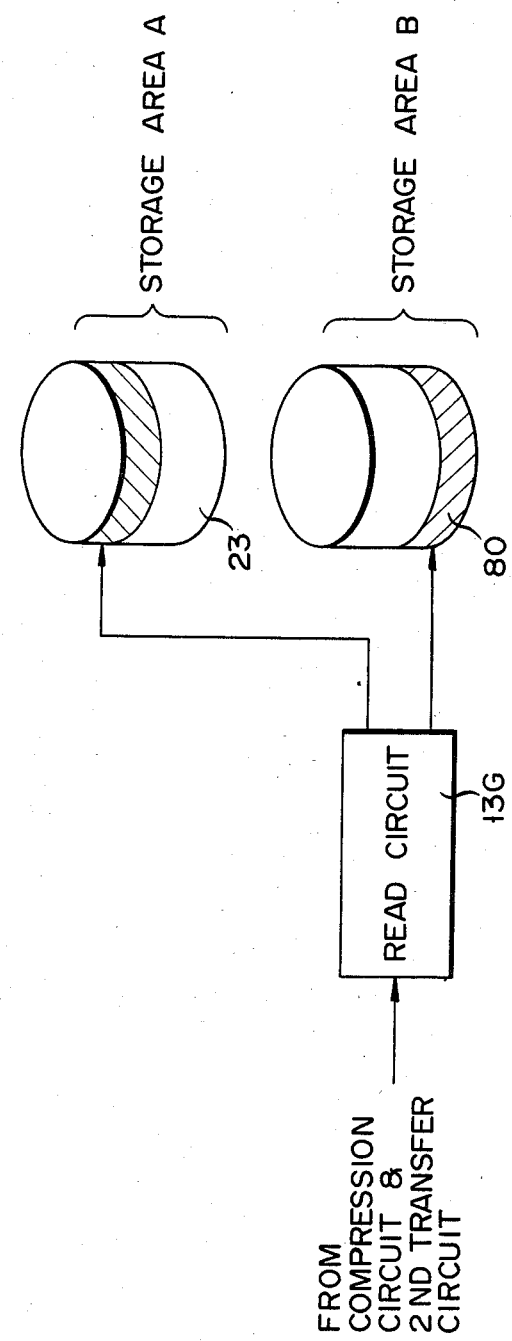

STORAGE OF IMAGE DATA IN BOTH ORIGINAL AND COMPRESSED FORMS

BACKGROUND OF THE INVENTION

1. (Field of the Invention)

This invention relates to a CT image processing apparatus having a magnetic disk storage device in the medical diagnostic field.

2. (Description of the Prior Art)

In a CT (computerized tomography) apparatus, reconstruction image data is stored in a storage device such as a magnetic disk storage device (simply referred to as "a magnetic device") with or without being compressed to a smaller data amount.

In general, when the amount of reconstruction image is expressed in 16 bits, a large capacity of 200 Kbytes is required for a 320×320 matrix.

For headscans for a patient, 10 to 20 CT images are acquired. Therefore, the amount of data acquired by the apparatus per day is therefore about several ten Mbytes.

Compression of the image data can be performed by various methods. According to one method, first image data A0 stored in a main memory is stored in a first area of the memory disk. As for second image data A1 in the main memory, the difference of two pixels or difference data B1 between the first image data A0 and second image data A1, i.e., (A1−A0) is stored in a second area of the memory disk. As for third image data A2 in the main memory, difference data B2 between the second image data A1 and third image data A2 is stored in a third area of the memory disk. Likewise, the differences of the every adjacent two image data are stored in predetermined areas of the memory disk. When the image data in the main memory has 16 bits and the difference between every two adjacent image data has 8 bits, compression of the image data to a data length of 8 bits is performed. In this compression method, when the difference between two adjacent image data exceeds 127 (i.e., $2^7 - 1 = 127$), a flag S of 8 bits representing an overflow is stored in an area preceding the area for storing this difference.

Registration and storage of image data according to the non-compression method has an advantage in that image data can be read out from the memory disk and be transferred to and displayed at a display device without performing any data conversion. This means that fast access to the image data can be performed. However, since the amount of one image data is relatively large, only a small number of image data can be stored in the memory disk.

Registration and storage of image data according to the compression method has an advantage in that a large number of image data can be stored in a memory disk since the amount of each image data is small due to data compression. However, when image data is read out from the memory disk, the image data must be subjected to expansion processing. In other words, as shown in FIG. 2, the second difference data B1 stored in the second area of the memory disk is added to the first image data A0 stored in the first area of the memory disk, and the obtained second image data A1 is stored in the main memory. Therefore, the access time of image data is prolonged by a time required for such expansion processing.

For example, when a sagittal image of a specific portion of the patient is to be obtained from the acquired image data, lengthy processing must be performed.

The present invention has been made in consideration of this and has as its object to provide a CT image processing apparatus in which both compressed and non-compressed image data are stored in a memory disk, and a high-speed access of image data can be performed without reducing the permissible number of image data to be stored.

SUMMARY OF THE INVENTION

The object of the present invention may be accomplished by providing a CT image processing apparatus comprising, an image production unit for producing a plurality of image data of an object under examination, a main memory for storing the plurality of image data, a compressor for compressing the image data so as to derive compressed image data, a write unit for writing non-compressed image data derived from the main memory and the compressed image data, the above-mentioned both image data being originated from one of the plurality of image data, a storage disk having at least first and second storage areas, whereby the compressed image data is stored in the first storage area and the non-compressed image data is stored in the second storage area under the control of the write unit in such a way that the compressed image data has priority over the non-compressed image data in the storage operation, a read unit for reading the non-compressed image data when the compressed and non-compressed image data are stored in the storage disk, an expansion unit for expanding the compressed image data upon the compressed image data being read from the read unit, and an image processor for image-processing at least one of the non-compressed image data and the expanded compressed image data transferred via the main memory from the read unit and the expansion unit respectively.

BRIEF DESCRIPTION OF THE DRAWINGS

The invention is best understood by reference to the accompanying drawings, in which:

FIG. 5 illustratively shows the magnetic disk shown in FIG. 4;

FIG. 9 shows a block diagram of the magnetic disks and their relevant circuit according to a second embodiment.

DETAILED DESCRIPTION OF THE PREFERRED EMBODIMENTS

Figure 1:
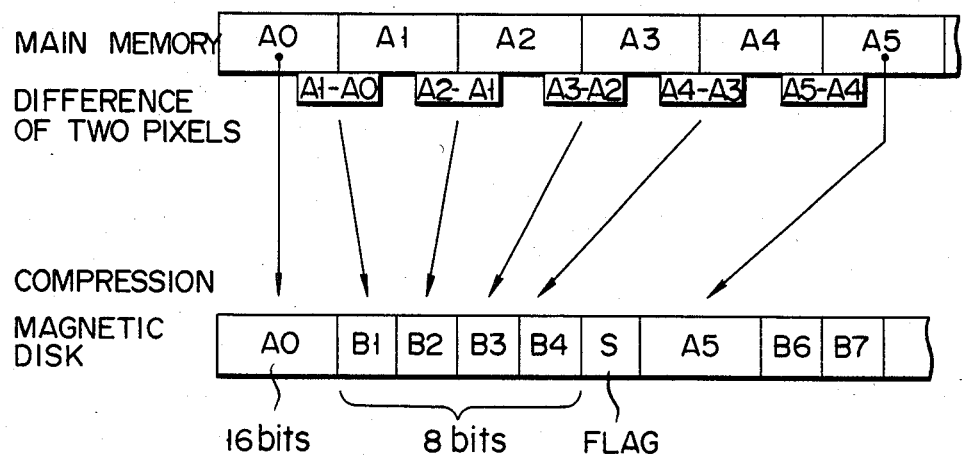
FIG. 1 is an illustration for explaining a data compression method.

Before proceeding with various types of the preferred embodiments according to the invention, the principle idea of the present invention will now be summarized.

In a CT image processing apparatus having a storage device such as a magnetic disk according to the present invention, e.g., an X-ray CT image processing apparatus, two types of data, i.e., compressed and non-compressed image data are stored in the magnetic disk for one image data, and a higher priority is given to storage of the compressed image data. The storage area of the disk is mainly divided into two storage areas. One storage area is allocated for storing compressed data, and the other is allocated for storing non-compressed data. However, this allocation of the storage areas, that is, a boundary between areas is not fixed. In other words, a storage area for storing compressed data is designed to have a higher priority than a storage area for storing non-compressed data with respect to the data storage. When the storage area for storing compressed data is used up and still further compressed data is inputted, the non-compressed data which has been stored in the storage area for storing it is replaced by the input compressed data. Then, the new compressed data is stored in the area thus made available. In effect, the storage area for storing compressed data is enlarged, while that for storing non-compressed data is reduced. This is what is meant by the "priority" above.

When replacement of non-compressed data and writing of compressed data as described above are continued, all the storage area of the disk is occupied with the compressed data.

A magnetic disk of this type generally has a capacity for storing, e.g., 600 compressed data or 200 non-compressed data. Therefore, when about 10 CT images are acquired for each patient and the image data is stored as compressed data and non-compressed data in the disk, the total amount of data acquired is smaller than the capacity of the memory. In other words, in general, a magnetic disk has an empty storage region in which neither compressed data nor non-compressed data is stored.

The present invention has been realized on the basis of effective utilization of such an empty region in the two storage regions or areas for storing compressed data and non-compressed data. According to the effective utilization method, when data of one CT image is stored in a disk as compressed data and non-compressed data (original image data), storage of compressed data is performed with a higher priority than that of non-compressed data. Therefore, until all the storage area is occupied with compressed data, both the compressed data and non-compressed data are present. Therefore, high-speed access to the non-compressed data is facilitated.

The terms and their definitions to be used herein will be briefly described so as to allow easy understanding of embodiments of the present invention.

First, a directory number (to be referred to as "DNo") is a number given to each image data for allowing retrieval thereof. When a disk storing image data is edited, this number is updated. The number DNo consists of a group number for each patient and a photographed image No. of the patient. For example, the number DNo is "999:99". The front part "999" of this directory number represents 999th patient, and the rear part "99" thereof represents the 99th image of this patient. Image data access to the image data is performed in accordance with the number DNo.

The directory DNo can be given by directly inputting a number by the conversation method or by incrementing/decrementing (indirect input) a number with a search key.

Figure 2:
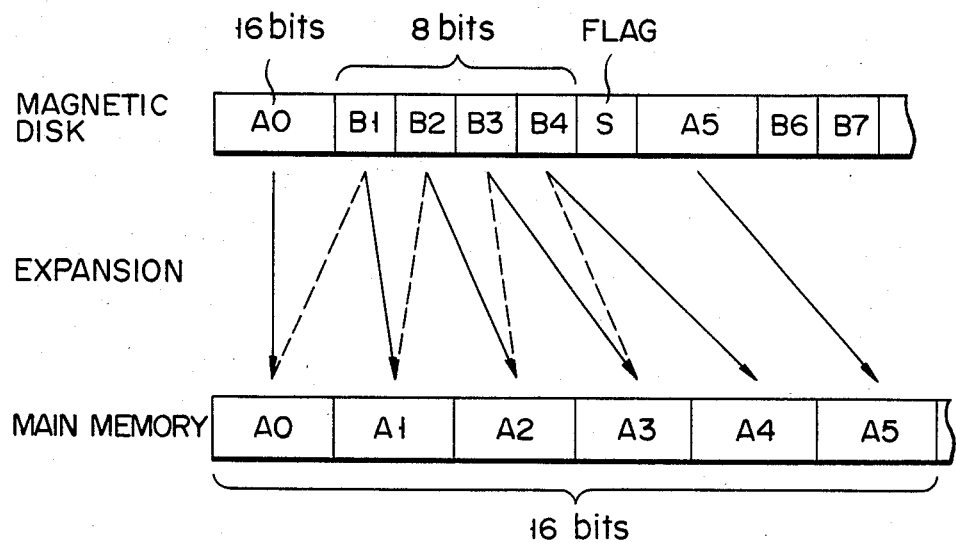
FIG. 2 is an illustration for explaining a data expansion method.

As described with reference to FIGS. 1 and 2, one pixel is represented by 16 bits in this invention. In other words, the black/white density of the CT image data is represented by 16 bits and is represented, upon compression, by 8 bits. It is to be noted that the present invention is not limited to these number of bits.

Figure 3:
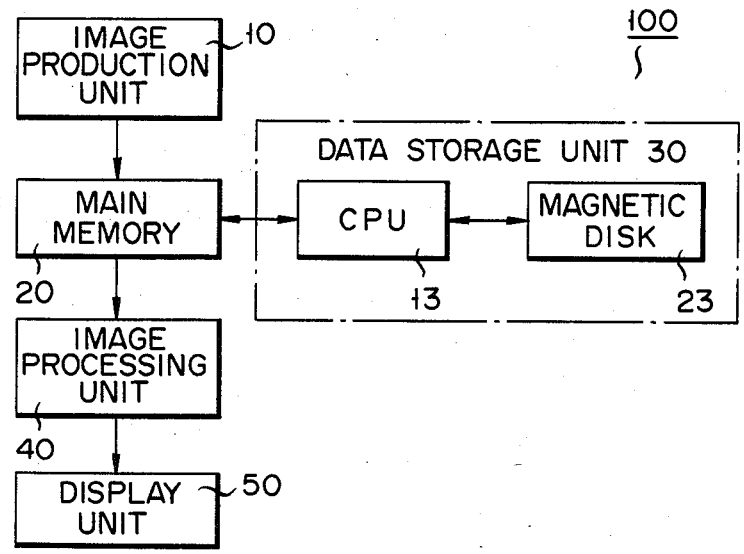
FIG. 3 shows a block diagram of a CT image processing apparatus according to one preferred embodiment of the invention.

A description will now be made of a CT image processing apparatus 100 according to a first preferred embodiment. In FIG. 3, the CT image processing apparatus 100 is mainly constructed by an image production unit 10, a main memory 20, a data storage unit 30, an image processing unit 40, and a display unit 50. The data storage unit 30 includes a CPU 13 and a magnetic disk 23.

In this apparatus 100, the main memory 20 stores the image data from the image production unit 10 for acquiring image data of, for example, an X-ray CT image and supplies the image data to the data storage unit 30. The main memory 20 also stores image data from the data storage unit 30 and supplies it to the image processing unit 40. Thus, the data storage unit 30 stores image data from the main memory 20. Referring to FIG. 3, the display unit 50 receives the image data processed by the image processing unit 40 and displays a processed image.

The data storage unit 30 has the CPU 13 and the magnetic disk 23. The CPU 13 generates, by means of a function means to be described later, compressed data from the input image data received from the main memory 20 and produces the compressed data and image data before compression (non-compressed data) (FIG. 1), expands the compressed data into the image data as non-compressed data (FIG. 2), and supplies it to the main memory 20. The memory disk 23 has a first storage area A for storing compressed data to be described later, and a second storage area B for storing non-compressed data to be described later. The memory disk 23 stores the compressed data and non-compressed data from the CPU 13 in the first and second storage areas A and B.

Figure 4:
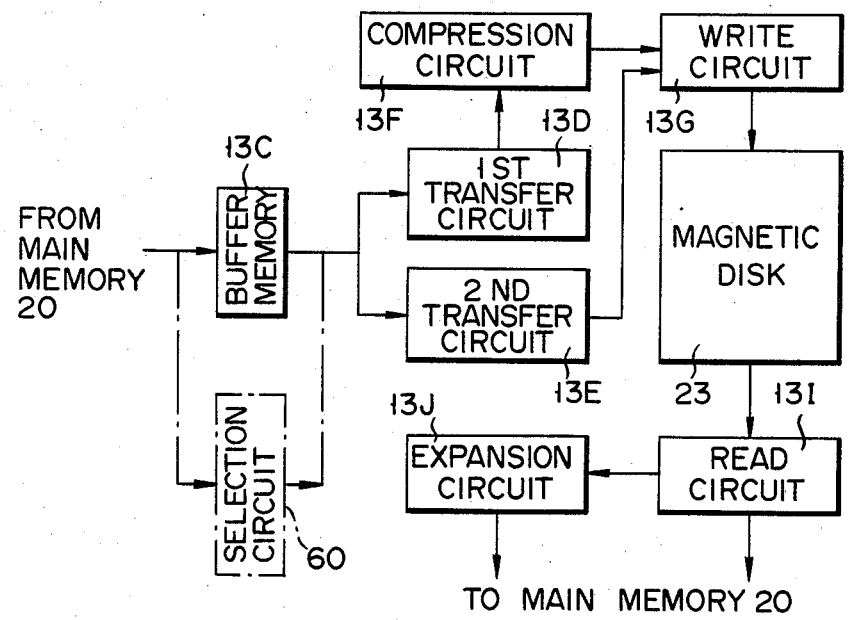
FIG. 4 shows a block diagram of an internal circuit of the data storage unit shown in FIG. 3.

The CPU 13 has the function means as shown in FIG. 4. A buffer memory 13C temporarily stores image data of a plurality of images produced from the main memory 20 and thereafter supplies the data to a first transfer circuit 13D and a second transfer circuit 13E. The first transfer circuit 13D transfers the image data from the buffer memory 13C to a compression circuit 13F. The second transfer circuit 13E transfers the same image data supplied to the first transfer circuit 13D from the buffer memory 13C to a write circuit 13G. The compression circuit 13F compresses transferred image data and then transfers the compressed data to the write circuit 13G. Compression processing to be performed by the compression circuit 13F may be a processing wherein input image data is converted into image data having a data length ⅓ the original length, as will be described later.

The write circuit 13G writes compressed data in the first storage area in the magnetic disk 23 and writes non-compressed data in the second storage area therein. Assume that one filing disk 23A is used for the memory disk 23 as shown in FIG. 5 and it has a memory area (capacity) for storing 400 image data in terms of non-compressed data. Then, the first area to the 200th area are defined as the first storage area A and store 600 compressed data (⅓ compressed data). Similarly, the 201th area to the last area are defined as the second storage area B and store 200 non-compressed data. The magnetic disk 23 has a control table area in addition to these storage areas. This will be described later in detail.

The function means for reading out data has the following configuration. A read circuit 13I reads out data required for image processing from the memory disk 23. When the readout data is compressed data, the read circuit 13I transfers the data to an expansion circuit 13J. However, when the readout data is non-compressed data, the read circuit 13I transfers the data to the main memory 20. The expansion circuit 13J expands the compressed data transferred from the read circuit 13I to a length of, for example, three times to convert the data into the original non-compressed data. The expansion circuit 13J then transfers the obtained data to the main memory 20.

The mode of operation of the image processing apparatus 100 will be described. The overall operation mode will first be described.

Image data acquired by the image production unit 10, e.g., X-ray image data is temporarily stored in the main memory 20 and is then transferred to the data storage unit 30 in units of images.

The data storage unit 30 transfers the image data received in units of images to the compression circuit 13F through the buffer memory 13C and the first transfer circuit 13D. At the same time, the data storage unit 30 transfers the same image data to the write circuit 13G through the buffer memory 13C and the second transfer circuit 13E. The compression circuit 13F compresses the received image data into a data length of ⅓ the original length and transfers the obtained compressed data to the write circuit 13G. The write circuit 13G sequentially writes the non-compressed data transferred from the second transfer circuit 13E from the final area (at the bottom in the figure) of the second storage area of the filing disk 23A, as shown in FIG. 5. At this time, the directory number DNo and the store address data of the non-compressed data are written in the control table area (this will be described later in detail). Meanwhile, the write circuit 13G sequentially writes the compressed data transferred from the compression circuit 13F from the first (top in the drawing) to a predetermined area in the first storage area A of the filing disk 23A as the magnetic disk 23.

The image data required for image processing by the image processing unit 40 is read out from the magnetic disk 23 in the following manner. The read circuit 13I reads out the directory number and the storage address data from the control table area of the filing disk 23A and checks if image data required for image processing is stored in the second storage area. If the image data to be read out is also stored in the second storage area (in this case, the compressed data corresponding to this data is stored in the first storage data), the non-compressed data is read out from the second storage data and is transferred to the main memory 20. However, if the image data to be read out is stored only in the first storage area (in this case, the non-compressed data corresponding to this data was once stored in the second storage area but was later erased upon storage of other compressed data), the compressed data is read out from the first storage area and is transferred to the expansion circuit 13J. The expansion circuit 13J expands the received compressed data to a length three times the original length, and transfers the expanded data to the main memory 20.

After the main memory 20 temporarily stores image data transferred from the read circuit 13I and the expansion circuit 13J, it transfers the data to the image processing unit 40. The image processing unit 40 performs necessary processing and an image is displayed properly at the display unit 50.

A series of write/read operations described above will be described in further detail.

As a condition, various files of the magnetic disk 23A will first be described.

The magnetic disk 23 consists of three files; a retrieval file, an information file, and a data file.

The retrieval file is for obtaining an information address of an image from the directory number DNo. The retrieved data is grouped for each patient, and each group is divided into 95 image data. The data has non-compressed data. The information file stores information such as photographic conditions when an image was formed, and the like. A start address of the image data is stored in the information file.

The data file is a file for storing the image data (both compressed and non-compressed data).

Figure 6A:
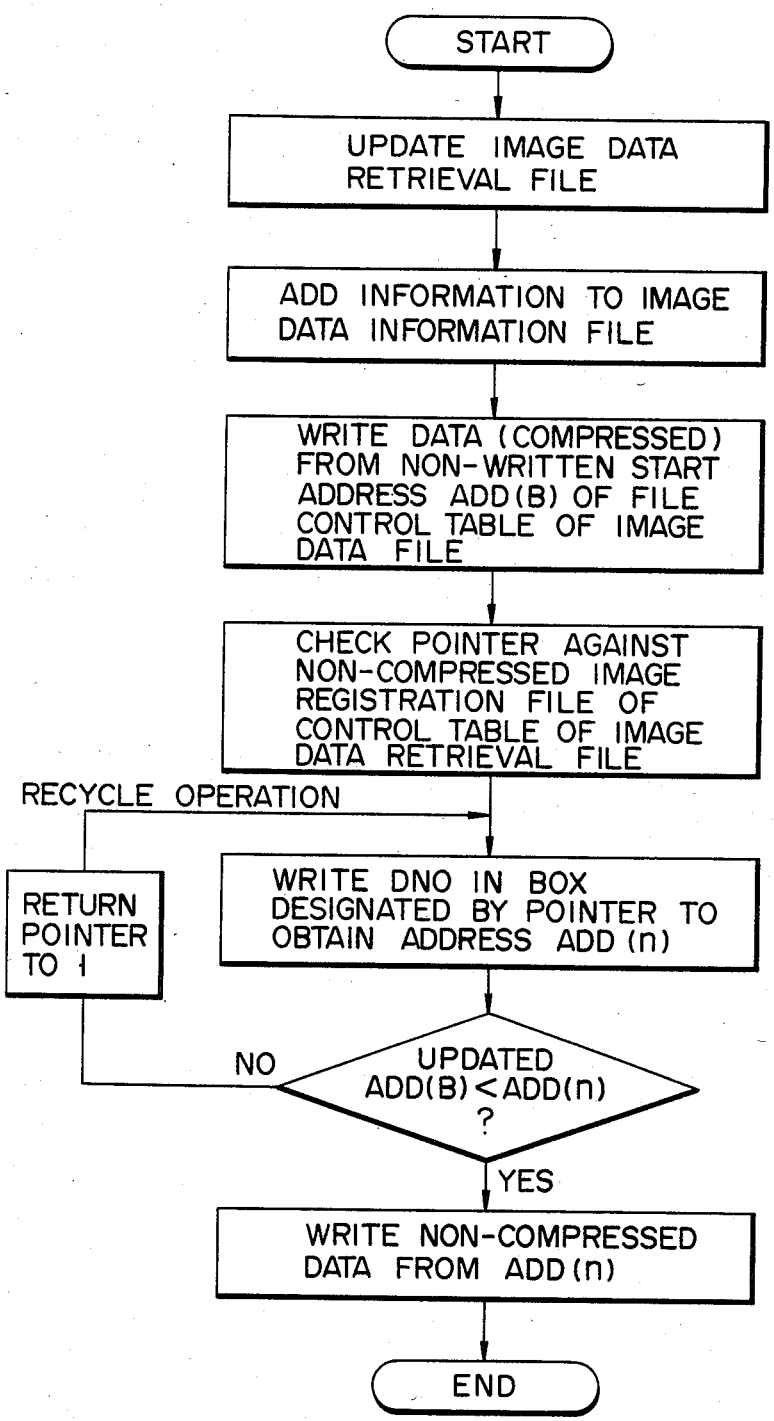
FIGS. 6A and 6B show a flow chart and an illustration for explaining a write operation of image data, respectively.
Figure 6B:
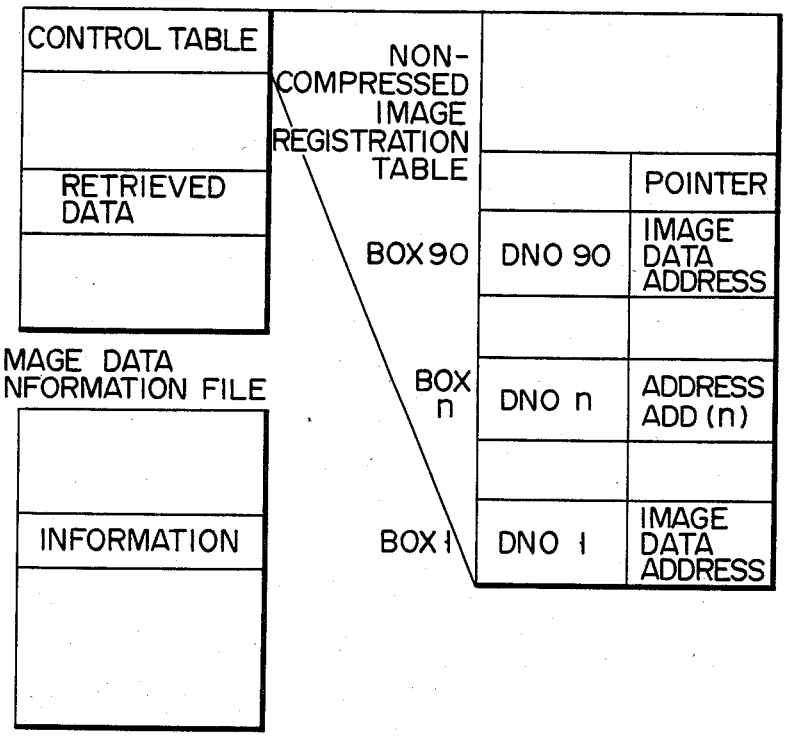
Figure 6B:
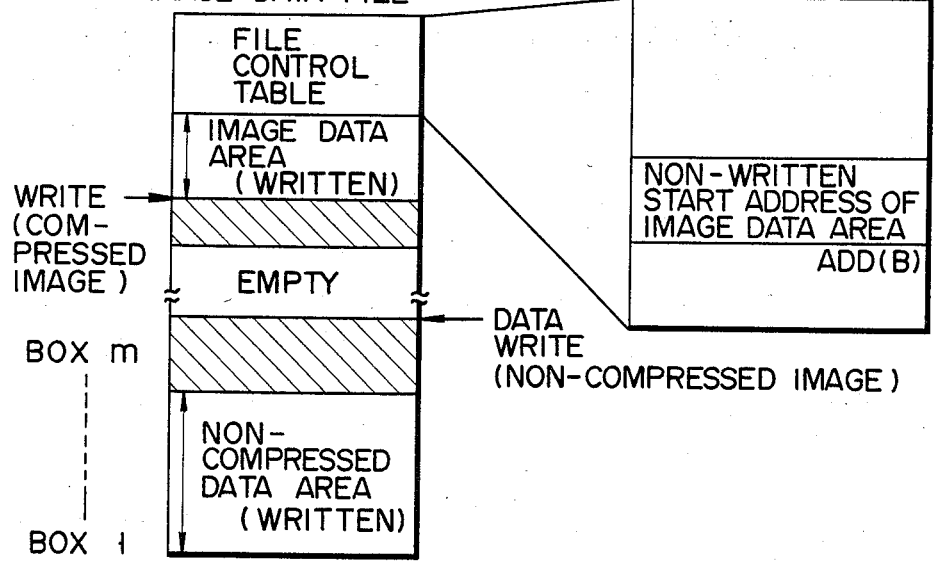

The write operation of the image data will be described with reference to the flow chart shown in FIG. 6A and a diagram shown in FIG. 6B.

First, the retrieval file is updated, and predetermined information is added to the information file. Next, data (compressed data) is written at a predetermined location of the disk 23 from a non-written start address (ADD(B)) stored in the file control table of the data file. Then, the value of a pointer is recognized in accordance with a non-compressed image register table stored in the control table of the retrieval file. An address number (ADD(n)) of a box is written which is designated by the pointer. When the updated address ADD(B) is larger than the obtained address ADD(n), the pointer value is decremented to 1. Again an address of the box pointed by the pointer is written. Accordingly, the non-compressed data which was first stored in this storage area is replaced by storing the latest non-compressed data. Such cyclical storing operation will be called "a recycle operation".

Then, when the updated address ADD(B) is smaller than the obtained address ADD(n), the non-compressed data is written from the address ADD(n) and processing is completed.

A description of the write operation for the compressed data will be omitted.

Figure 7:
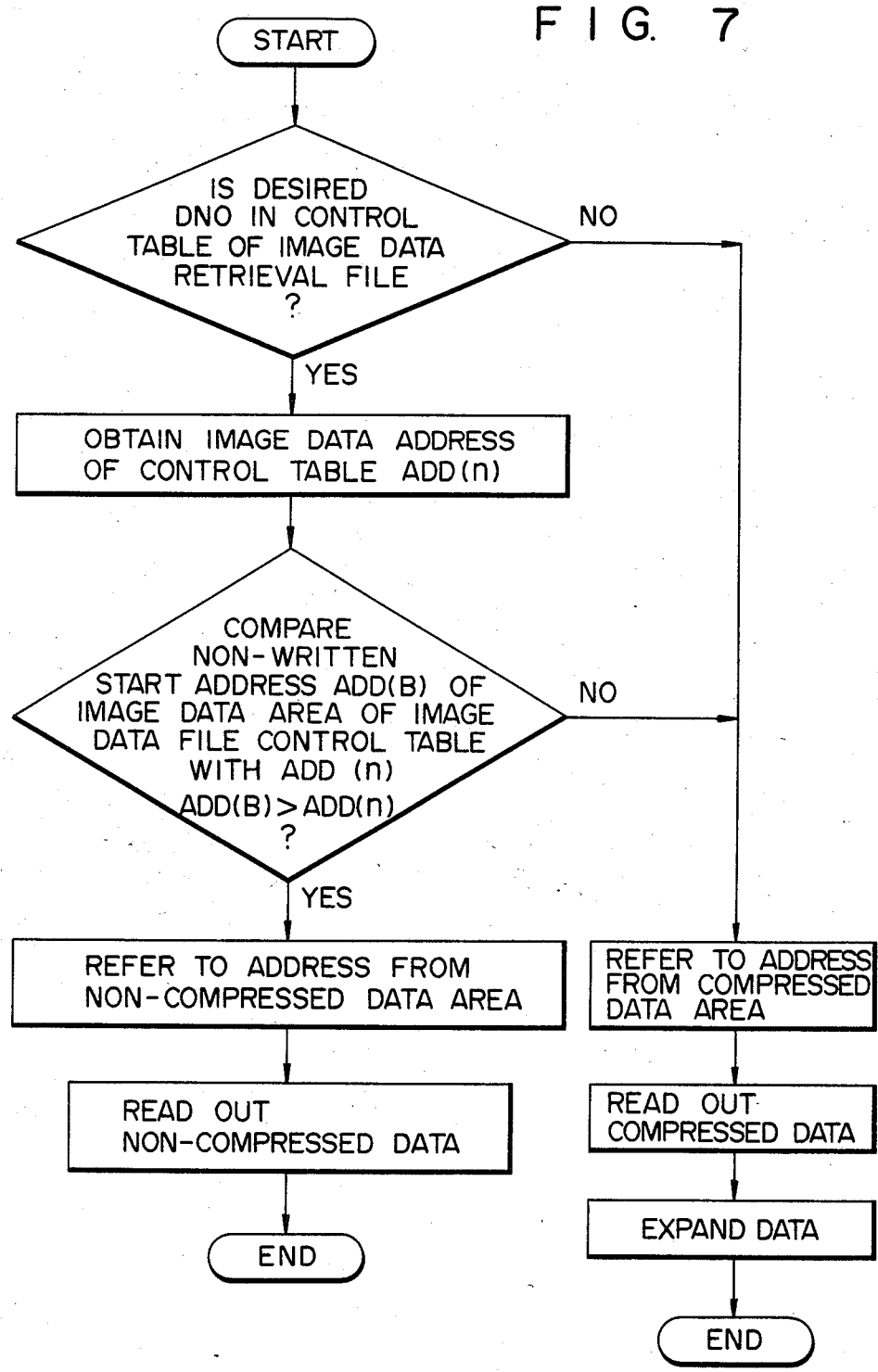
FIGS. 7, 8A and 8B show a flow chart and illustrations for explaining a read operation of image data, respectively.
Figure 8A:
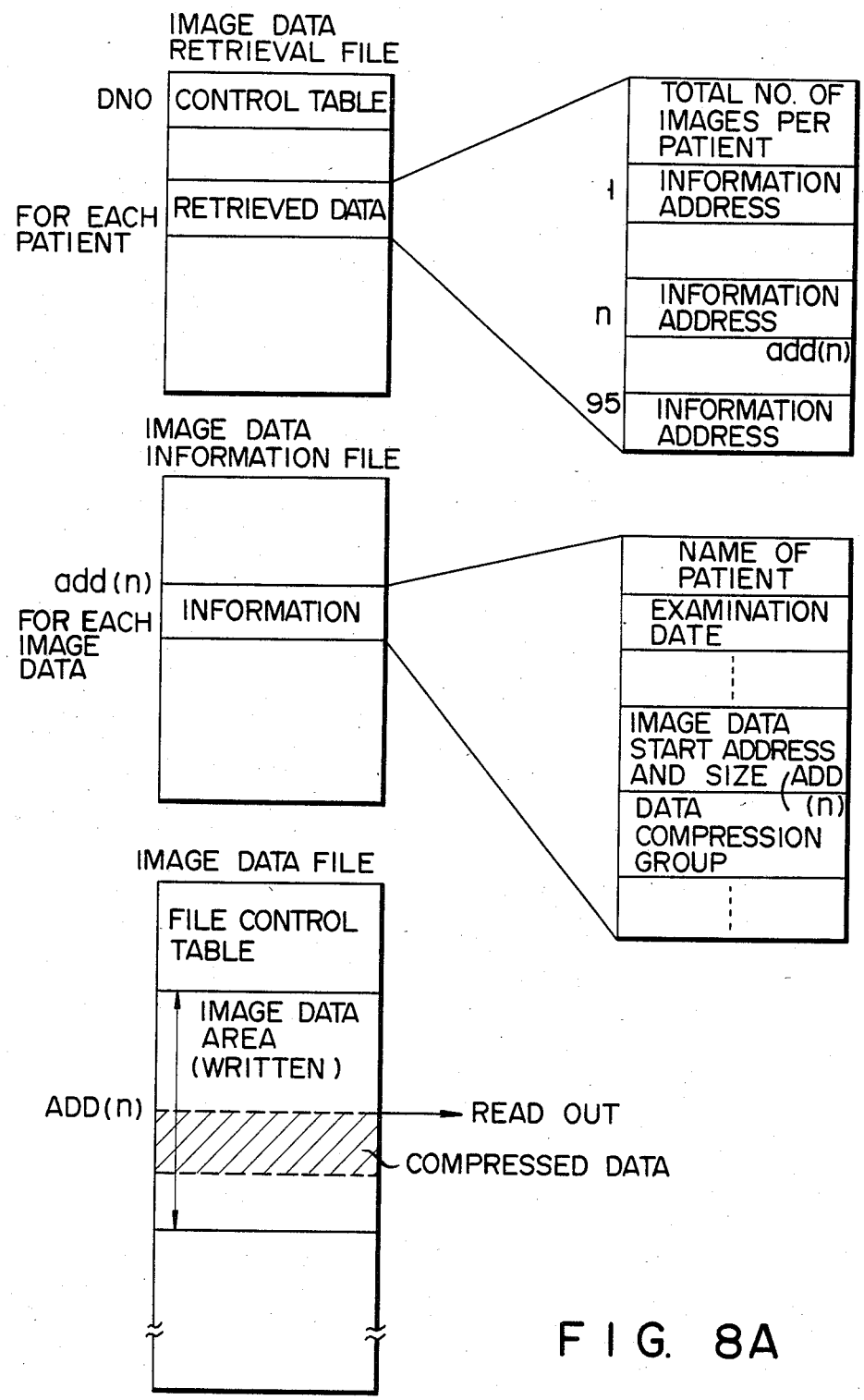

The read operation will be described with reference to FIGS. 7 and 8.

It is first checked if a desired directory number is in the control table of the retrieval file. If the desired directory number is not in the control table, since the non-compressed data has been erased, an address is referred in accordance with the corresponding compressed data. Then, the compressed data is read, expanded, and transferred to the main memory 20 (see FIG. 8A). Thus, the read and expanding operations of the compressed data are completed.

However, if the desired directory number is in the control table, this means that the non-compressed data is stored in the storage area B. Then, a predetermined processing operation as shown in FIG. 7 is performed to read out non-compressed data, and the readout non-compressed data is transferred to the main memory 20.

Figure 8B:
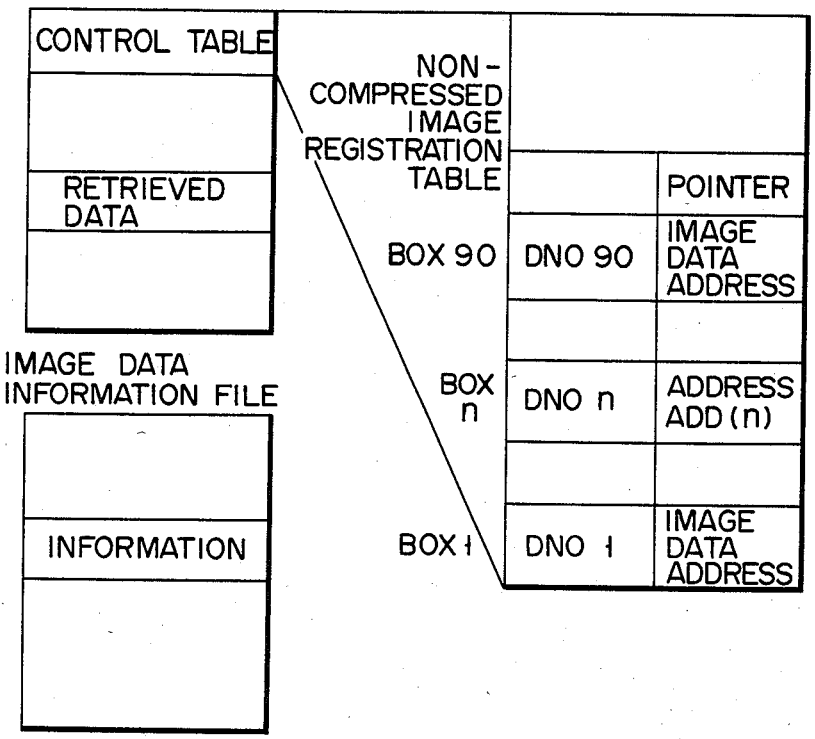
Figure 8B:
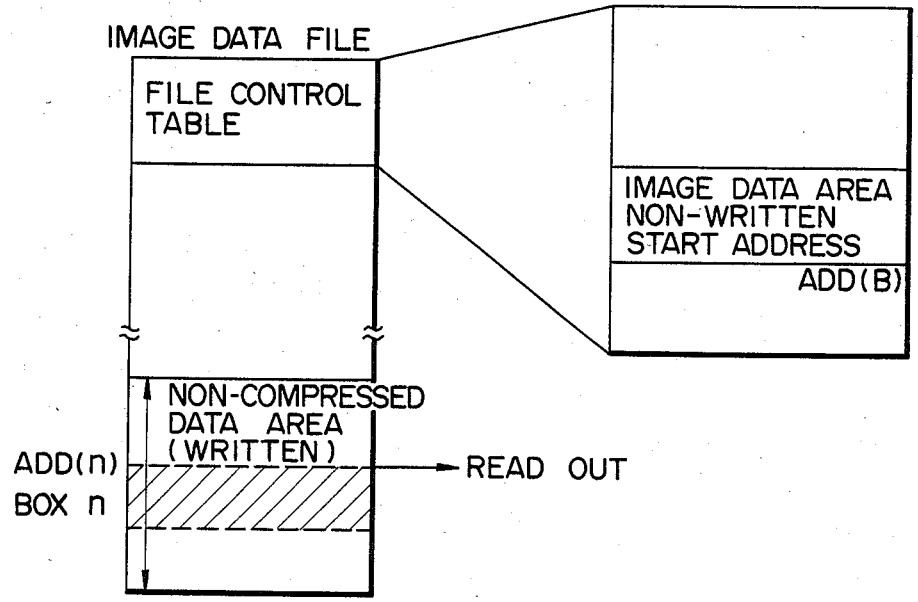

A read operation of the non-compressed data is thus completed (see FIG. 8B).

As described above, the amount of non-compressed data per X-ray image is fixed. Therefore, when the non-compressed data is stored in the storage area B, the address can be determined in advance. As a result, the non-compressed data can be sequentially stored from the lower location (bottom) of the area B in accordance with the fixed addresses. Therefore, the storage operation can be cyclically performed in the storage area B.

In contrast to this, the amount of compressed data changes each time in accordance with the original data amount. Therefore, address for storing the compressed data cannot be determined in advance. In this case, after the address of current compressed data is determined, the next address is determined and the data is stored in the storage area A.

A sagittal image or a coronal image of a specific portion of an object under examination can be obtained by processing acquired image data by the image processing unit 40.

In the apparatus of the present invention, while it takes about 6 to 7 seconds to expand compressed data, it takes only about 2 seconds to read out non-compressed data. This explains the following advantage. That is, when there is any non-compressed data remaining in the storage area B in a read operation, this data can be read out and displayed. Therefore, the overall access time can be shortened (as compared to a case wherein only compressed data is remaining in the memory).

Although the present invention has been described with reference to the particular embodiment, the present invention is not limited to this. Various changes and modifications may be made within the spirit and scope of the present invention.

In the above embodiment, one memory disk 23 is used as shown in FIG. 5, and the memory disk 23 has the first storage area A and the second storage area B. However, as shown in FIG. 9, two memory disks 23 and 80 may be used. In this case, the memory disk 23, for example, has the first storage area A, and the memory disk 80 has the second storage area B.

In the buffer memory 13C, all the image data is simultaneously transferred to the first transfer circuit 13D and the second transfer circuit 13E. However, instead of transferring image data from the buffer memory 13C, image data which is more frequently used can be selected from image data transferred from the main memory 20. All the data can then be supplied to the first tranfer circuit 13D, and only the image data which is more frequently used can be supplied to the second transfer circuit 13E, by means of a selector 60, as indicated by the dotted line in FIG. 4.

According to the present invention, a large number of image data obtained by an image processor are compressed and stored also in a non-compressed state. Therefore, as compared to a conventional case wherein only non-compressed data is stored in a memory disk, a large number of image data can be stored. Furthermore, since the same image data is not compressed and is stored in the memory disk, an image processing apparatus of a simple configuration is provided in which an access time to image data to be processed can be shortened.

What is claimed is:

1. A tomographic image processing apparatus comprising:

means for producing a plurality of image data of an object under examination;

main memory means for storing said plurality of image data;

means for compressing said image data so as to derive compressed image data;

means for writing non-compressed image data derived from said main memory means and said compressed image data, said both image data being originated from one of said plurality of image data;

storage disk means having at least first and second storage areas, whereby said compressed image data is stored in said first storage area and said non-compressed image data is stored in said second storage area under the control of said write means in such a way that said compressed image data has priority over said non-compressed image data in the storage operation;

means for reading said non-compressed image data when said compressed and non-compressed image data are stored in said storage disk means;

means for expanding said compressed image data upon said compressed image data being read from said read means, and;

means for image-processing at least one of said non-compressed image data and said expanded compressed image data transferred via said main memory means from said read means and said expansion means respectively.

2. An apparatus as claimed in claim 1, further comprising a buffer memory for temporarily storing said image data transferred from said main memory means;

a first transfer circuit for transferring said image data from said buffer memory to said compression means, and;

a second transfer circuit for transferring said image data as said non-compressed image data from said buffer memory to said write means.

3. An apparatus as claimed in claim 2, wherein second storage disk means is further provided so as to store one of said compressed image data and said non-compressed image data, whereby the remaining image data is stored in said first storage disk means.

4. An apparatus as claimed in claim 1, further comprising a selection circuit for selecting highly-usable image data from said plurality of image data stored in said main memory means;

a first transfer circuit for transferring all of said image data from said main memory means to said compression means, and;

a second transfer circuit for transferring said highly-usable image data from said selection circuit to said write means.

5. A tomographic image processing apparatus comprising:

means for producing a plurality of image data of an object under examination;

main memory means for storing said plurality of image data;

means for compressing said image data so as to derive compressed image data;

means for writing non-compressed image data derived from said main memory means and said compressed image data, said both image data being originated from one of said plurality of image data;

storage disk means having at least first and second storage areas, whereby said compressed image data is stored in said first storage area and said noncompressed image data is stored in said second storage area under the control of said write means in such a way that said compressed image data has priority over said non-compressed image data in the storage operation and the storage operation of said non-compressed image data continues until the second storage area is filled with the compressed image data;

means for reading said non-compressed image data when said compressed and non-compressed image data are stored in said storage disk means;

means for expanding said compressed image data upon said compressed image data being read from said read means, and;

means for image-processing at least one of said non-compressed image data and said expanded compressed image data transferred via said main memory means from said read means and said expansion means respectively.

6. An apparatus as claimed in claim 5, further comprising a buffer memory for temporarily storing said image data transferred from said main memory means;

a first transfer circuit for transferring said image data from said buffer memory to said compression means, and;

a second transfer circuit for transferring said image data as said non-compressed image data from said buffer memory to said write means.

7. An apparatus as claimed in claim 6, wherein second storage disk means is further provided so as to store one of said compressed image data and said non-compressed image data, whereby the remaining image data is stored in said first storage disk means.

8. An apparatus as claimed in claim 5, further comprising a selection circuit for selecting highly-usable image data from said plurality of image data stored in said main memory means;

a first transfer circuit for transferring all of said image data from said main memory means to said compression means, and;

a second transfer circuit for transferring said higly-usable image data from said selection circuit to said write means.

* * * * *